United States Patent [19]

Mikulencak

[11] Patent Number: 5,156,054

[45] Date of Patent: Oct. 20, 1992

[54] APPARATUS FOR TENSIONING V-BELT DRIVES

[76] Inventor: Jeff Mikulencak, 219 Corkwood, Lake Jackson, Tex. 77566

[21] Appl. No.: 562,259

[22] Filed: Aug. 6, 1990

[51] Int. Cl.$^5$ .............................................. G01L 5/06
[52] U.S. Cl. ............................................. 73/862.471
[58] Field of Search ............ 73/862.45, 862.47, 862.48

[56] References Cited

U.S. PATENT DOCUMENTS 3,391,574  7/1968  Howard .......................... 73/862.47
3,482,442  12/1969  Howard .......................... 73/862.47
3,839,908  10/1974  Casper ............................. 73/862.47

Primary Examiner—Charles A. Ruehl
Assistant Examiner—Elizabeth Shopbell
Attorney, Agent, or Firm—John Lezdey

[57] ABSTRACT

An apparatus for use in tensioning the belt on a V-belt drive having a compression gauge and a gauge for measuring the deflection of the belt with regard to a fixed reference simultaneously with the compression. The compression gauge is associated with at least two compression rods which provide the compression at two points on the belt.

6 Claims, 2 Drawing Sheets

APPARATUS FOR TENSIONING V-BELT DRIVES

FIELD OF THE INVENTION

The present invention relates to an apparatus for use in tensioning the belts in V-belt drives. More particularly, the invention is concerned with a device which measures the compression force and deflection distance of the belts on a V-belt drive.

BACKGROUND OF THE INVENTION

When designing a drive for a machine it is advisable to specify data for use in tensioning the drive. Many users of V-belt drives rely on their experience and the general rules for tensioning drives, but it has become a common practice to actually measure the tension in a drive. Numerical methods for tensioning a drive have several advantages, for example, they prevent inexperienced personnel from drastically overtensioning or undertensioning a drive, thus preventing possible bearing or belt damage. Even with experienced personnel, it helps the individual to get a feel for the tension needed in a particular drive. This is especially important with modern drives, where each V-belt is rated for higher horsepower than were previous belts. If a belt is to carry more horsepower, it must be installed proportionally tighter. Experience with older drives may lead to undertensioning of modern drives unless tension is measured at least once to help get the feel for correct tension.

SUMMARY OF THE INVENTION

The present invention provides an apparatus for use in tensioning the belt on a V-belt drive comprising a housing having at the top a plurality of cylindrical chambers. At least two of the chambers contain a compression spring means and a compression rod associated with the compression spring means for testing the compressive force. A cylindrical chamber is provided to house a calibrated gauge means which indicates the amount of compressive forces on the spring means. The compression rods and the gauge means are attached to a handle for simultaneously compressing each spring means and causing a reading on the gauge means to indicate the compressive force.

At the bottom of the housing there is provided a gauge means for measuring the deflection of the belt simultaneously with the measurement of compression.

Preferably, the housing contains a slot on the bottom which houses the gauge means for measuring the deflection.

It is therefore, an object of the invention to provide an apparatus for use in tensioning the belts of V-belt drives which simultaneously measures compressive force and deflection of the belt.

It is a further object of the invention to provide an apparatus for use in tensioning either vertical or horizontal belts of V-belt drives.

It is a still further object of the invention to provide an apparatus for use in tensioning the belts of V-belt drives which is easy to use and inexpensive to manufacture.

Other objects and a fuller understanding of the invention will be had by referring to the following description and claims taken in conjunction with the accompanying drawings.

DESCRIPTION OF THE PREFERRED EMBODIMENTS

Figure 1:
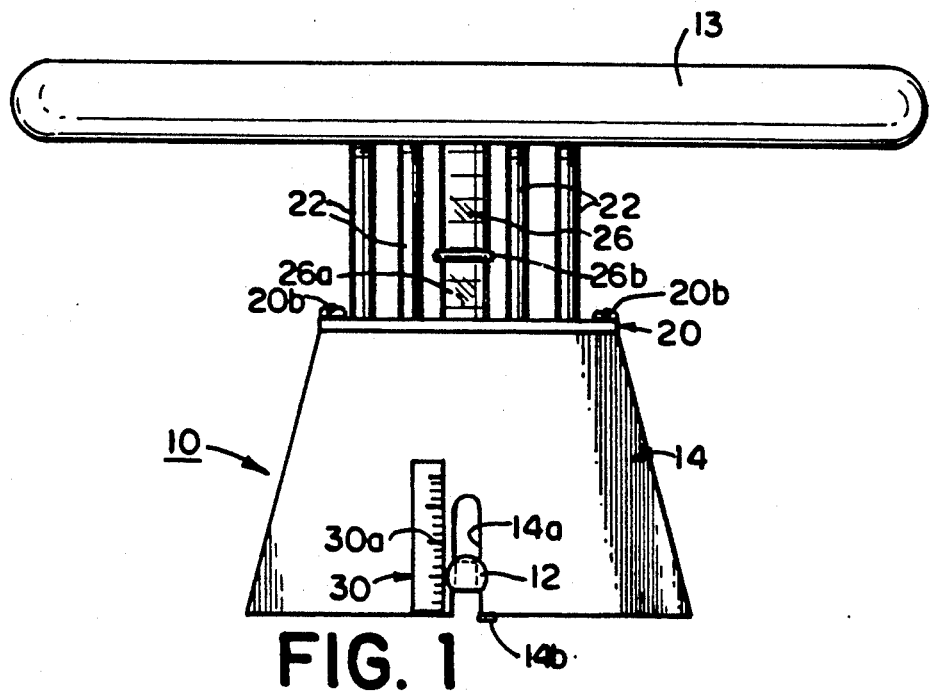
FIG. 1 is a plan view of the tensioning apparatus of the invention.

Although specific terms are used in the following description for the sake of clarity, these terms are intended to refer only to the particular structure of the invention selected for illustration in the drawings, and are not intended to define or limit the scope of the invention.

FIG. 1 illustrates the apparatus 10 of the invention which is used in tensioning the belts of V-belt drives. The apparatus 10 comprises a housing 14 which has a substantially flat bottom so as to sit perpendicularly on the belt of a horizonal or vertical belt on a V-belt drive. A slot 14a is provided in the housing 14 in which there is frictionally held a plug 12. Adjacent the plug 12 is a measuring device 30 such as a ruler with a scale 30a in inches or millimeters.

The apparatus 10 at the top portion is provided with a gauge 26 for measuring compression and compression rods 22 which are attached to a handle 13. The handle 13 enables the equal distribution of forces on the rods 22 and the compression gauge 26 so that there is a balance of forces for measuring compression. The gauge 26 has a scale 26a for reading the compressive forces used in tensioning a belt, and a frictionally held O-ring 26b that is slidable along the gauge 26 which indicates the compression when it abuts the cover 20. The O-ring can be manually set and the belt tensioned at the point in which the O-ring is set. Otherwise, the O-ring is set at the bottom in abutment of the cover 20 and rides up the gauge 26 when the handle 13 is compressed in order to obtain a compression reading.

Figure 2:
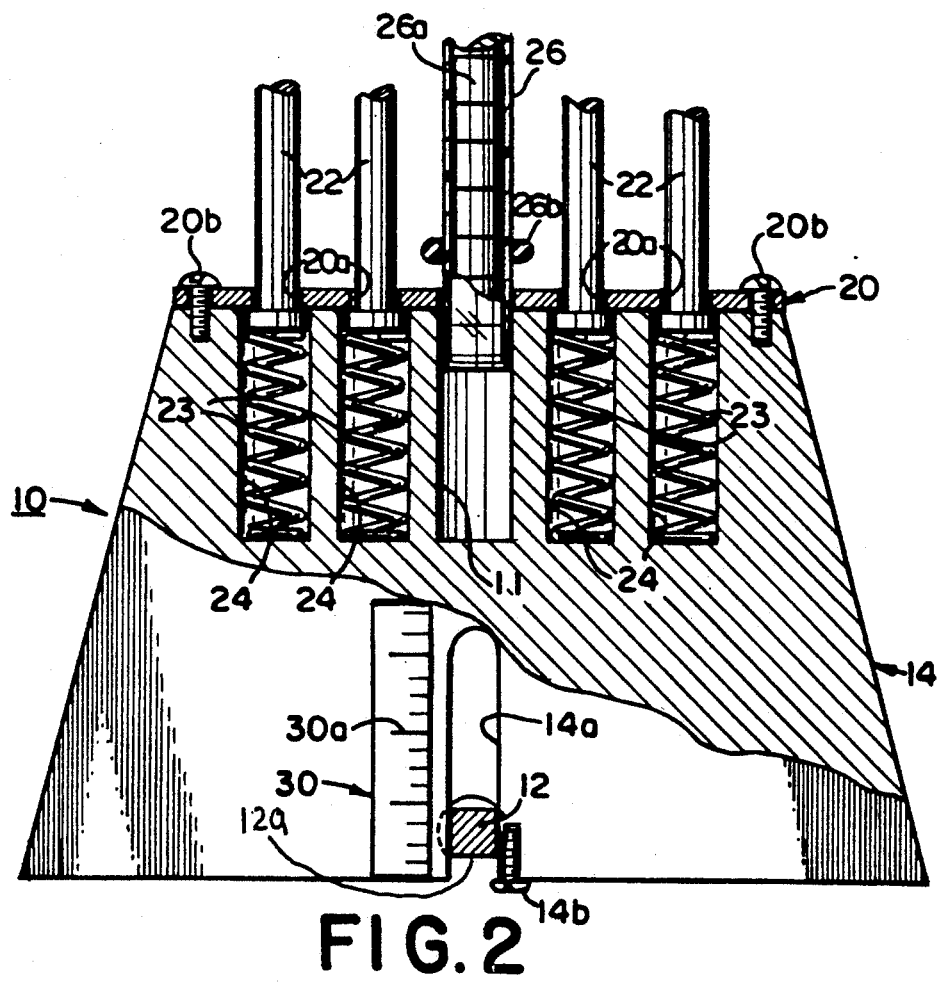
FIG. 2 is a partial sectional view of the tensioning apparatus of FIG. 1.

As seen in FIG. 2, the rods 22 are associated with compression springs 23 which are in their respective chambers 24. The rods 22 have enlarged heads and are held within the chambers 24 by the cover 20 with the apertures 20a through which the rods 22 protrude. The cover 20 is held in place by screws 20b.

Typically, the compression springs 24 are standard 25 psi springs which sit in the chamber 24 that is about 0.5 inch in diameter. At least two compression rods and springs are required for the apparatus, however, two of the compression units on each side of the compression gauge 26 provides a better balance of forces and greater precision in obtaining a reading of the compression.

Preferably, the housing 14 is comprised of aluminum so that it is readily machineable in its manufacture and lightweight. However, a hard thermosetting resin such as an acrylic resin, ionomer, polycarbonate or polyarylsulfone may be utilized.

The gauge 26 is positioned so to ride in chamber 11 when the handle 13 is compressed to measure the compressive force. The gauge 26 is equally spaced on each side from the compression spring chambers 24 for better balance. A calibrated scale 26a is provided which can be read in kilograms, Newtons or pounds by the position of the elastomeric O-ring 26b.

The means for measuring deflection of the belt comprises a frictionally held plug 12 having a flat face 12a is found within slot 14a. The plug 12 can be frictionally held within the slot by use of any conventional means, for example, such as a spring and ball bearing means (not shown) within the plug 12 which rides on the walls of slot 14a or a resilient member such as a spring or elastomer which holds the plug in a tight fit. A measure 30 which contains a scale 30a that can be calibrated in inches or millimeters is provided adjacent the plug 12.

Figure 3:
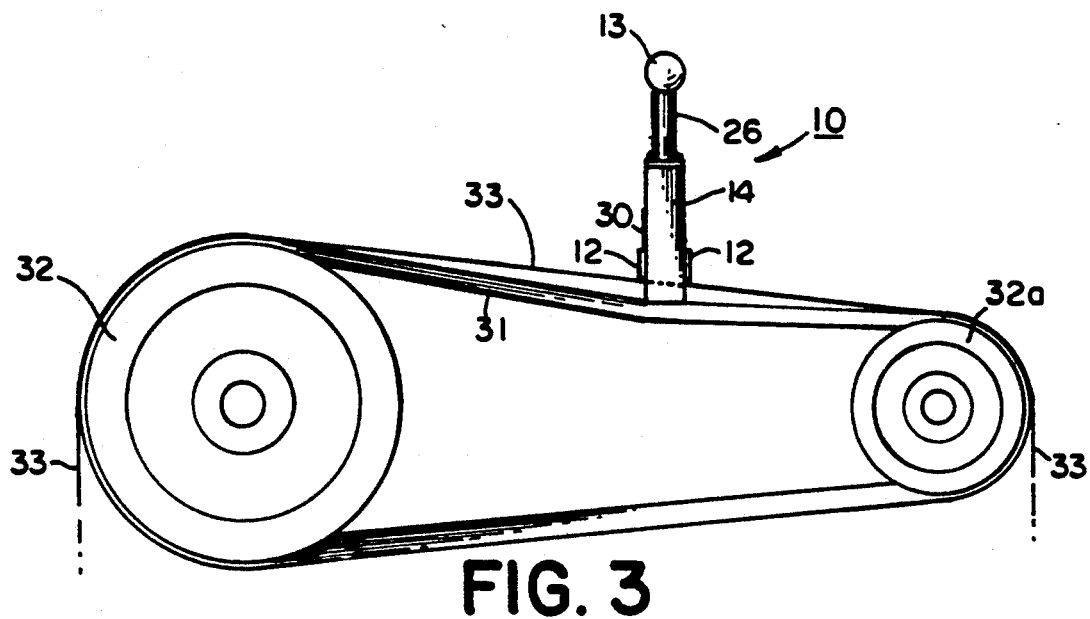
FIGS. 3 and 4 illustrate the use of the apparatus on a horizontal V-belt drive.
Figure 4:
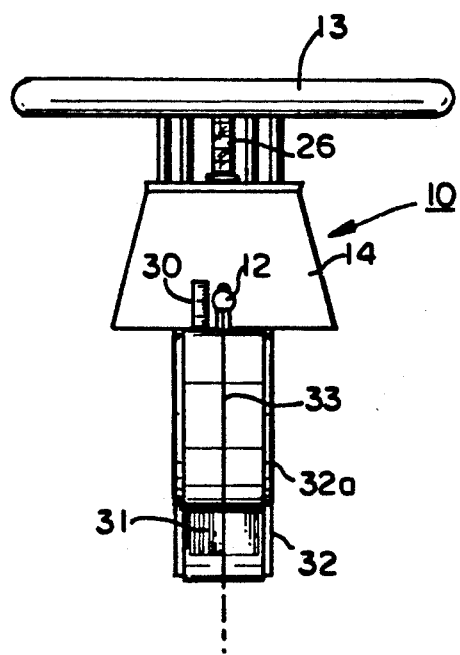

As seen in FIGS. 3 and 4, in order to measure the deflection and compression of belt 31 of a V-belt drive, a straight edge or a string 33 is stretched across the drives 32 and 32a to use as a reference point to measure deflection. The slide gauge 12 rests on the string 33 and is forced upward when the belt 31 is compressed downward perpendicularly by the apparatus 10. The amount of deflection is read on the measure 30 in inches or millimeters. Simultaneously, with the measurement of deflection, there is measured the compression force as the compression rods 22 are pushed against the springs 24 and the compression gauge 26 enters the chamber 11. As the gauge 26 is pushed into chamber 11, O-ring 26b abuts cover 20 and provides a reading on scale 26a. However, it is possible to preset the O-ring 26b to a desired line on scale 26a and then adjust belt 31 accordingly. Thereby, belt 31 can be adjusted to a preselected tension.

Since the housing has a long base, there is no need to use precise measurement to arrive at the same location on the left that is required in prior art devices with narrow bases. Preferably, the base is about 4 to 8 inches.

The invention may be embodied in other specific forms without departing from the spirit or essential characteristics thereof. The present embodiments are therefore to be considered illustrative and not restrictive, the scope being indicated by the appended claims rather than by the foregoing description, and all changes that come within the range of equivalency of the claims are therefore intended to be embraced therein.

What is claimed:

1. An apparatus for use in tensioning the belt on a V-belt drive comprising:

a housing having a plurality of parallel cylindrical chambers at the top of said housing and a substantially flat bottom and slot on the bottom of said housing, gauge means in one of said cylindrical chambers for measuring compression, compression spring means in at least two cylindrical chambers, compression rods associated with said compression spring means in each of said two chambers, handle means attached to each compression rod and said gauge means for simultaneously compressing said spring means and causing a reading of compressive force on said compression gauge, and gauge means within said slot at the bottom of said housing for measuring the deflection of said belt with respect to a fixed reference means simultaneously with said compression, said gauge means for measuring deflection comprising a member slidable within said slot which contacts said reference means and is forced upward when the belt is compressed downwardly perpendicularly by said apparatus so as to indicate the amount of deflection, and a scale adjacent said slidable member for reading the deflection simultaneously with the compression.

2. The apparatus of claim 1 wherein said slidable member is frictionally held within said slot.

3. The apparatus of claim 1 wherein said slidable member is manually reset.

4. The apparatus of claim 1 wherein said gauge for measuring compression comprises a scale means and a slidable O-ring on said scale means which contacts the top wall of said housing and indicates the compressive force for reading on said scale.

5. The apparatus of claim 1 wherein said housing contains a pair of cylindrical chambers with compression springs and compression rods associated therewith along two sides of said gauge for measuring compression.

6. The apparatus of claim 1 wherein said housing has a bottom which is substantially parallel to the top of said housing.

* * * * *